US010462959B2

(12) United States Patent
Whalen et al.

(10) Patent No.: US 10,462,959 B2
(45) Date of Patent: Nov. 5, 2019

(54) SEED FURROW CLOSING WHEEL

(71) Applicant: YETTER MANUFACTURING COMPANY, Colchester, IL (US)

(72) Inventors: Patrick T. Whalen, Colchester, IL (US); Derek A. Litchfield, Colchester, IL (US); Derek W. Allensworth, Colchester, IL (US)

(73) Assignee: YETTER MANUFACTURING COMPANY, Colchester, IL (US)

( * ) Notice: Subject to any disclaimer, the term of this patent is extended or adjusted under 35 U.S.C. 154(b) by 22 days.

(21) Appl. No.: 15/647,797

(22) Filed: Jul. 12, 2017

(65) Prior Publication Data

US 2018/0014454 A1    Jan. 18, 2018

Related U.S. Application Data

(60) Provisional application No. 62/361,062, filed on Jul. 12, 2016.

(51) Int. Cl.
| | | |
|---|---|---|
| *A01C 5/06* | (2006.01) | |
| *A01B 49/06* | (2006.01) | |
| *A01B 29/04* | (2006.01) | |

(52) U.S. Cl.
CPC .............. *A01C 5/068* (2013.01); *A01B 29/04* (2013.01); *A01B 49/06* (2013.01); *A01C 5/066* (2013.01)

(58) Field of Classification Search
CPC ......... A01C 5/064; A01C 5/066; A01C 5/068; A01C 7/046; A01B 23/06; A01B 49/06; A01B 49/027; A01B 29/04; A01B 29/041; A01B 21/00; A01B 21/02; A01B 21/04; A01B 21/08; A01B 21/086
See application file for complete search history.

(56) References Cited

U.S. PATENT DOCUMENTS

| | | | | |
|---|---|---|---|---|
| D137,446 S | * | 3/1944 | Schmeiser | ..................... 172/537 |
| 2,419,717 A | * | 4/1947 | Karl | ..................... A01B 33/103 |
| | | | | 172/556 |
| 5,896,932 A | * | 4/1999 | Bruns | ..................... A01C 5/068 |
| | | | | 172/556 |
| 5,970,891 A | | 10/1999 | Schlagel | |
| 7,730,961 B2 | * | 6/2010 | Ward | ..................... A01B 29/04 |
| | | | | 172/21 |
| 8,291,998 B1 | * | 10/2012 | Berg | ..................... A01C 5/066 |
| | | | | 172/173 |
| 2012/0325133 A1 | | 12/2012 | Whalen et al. | |
| 2014/0224513 A1 | * | 8/2014 | Van Buskirk | .......... A01C 5/066 |
| | | | | 172/140 |

FOREIGN PATENT DOCUMENTS

KR    20-1984-0002642       12/1985

OTHER PUBLICATIONS

Search Report and Written Opinion issued in Int'l App. No. PCT/US2017/041685 (dated 2017).

* cited by examiner

*Primary Examiner* — Alicia Torres
(74) *Attorney, Agent, or Firm* — Barnes & Thornburg LLP; Mark J. Nahnsen (57) ABSTRACT

A seed furrow closing wheel includes an annular rim and a plurality of teeth carried on the rim for rotation about an axis. The teeth extend radially outward from the rim and are circumferentially spaced apart from one another.

19 Claims, 6 Drawing Sheets

Fig. 9

SEED FURROW CLOSING WHEEL

CROSS-REFERENCE TO RELATED APPLICATIONS

This application claims priority under 35 U.S.C. § 119(e) to U.S. Provisional Application Ser. No. 62/361,062, filed Jul. 12, 2016, which is expressly incorporated by reference herein.

BACKGROUND

The present disclosure relates to farming equipment, and particularly to a seed furrow closing wheel. More particularly, the present disclosure relates to a toothed seed furrow closing wheel for attachment to a tractor or other seeding equipment.

SUMMARY

According to the present disclosure, a seed furrow closing wheel includes an annular rim and a plurality of teeth carried on the rim for rotation about an axis. The teeth extend radially outward from the rim and are circumferentially spaced apart from one another.

In illustrative embodiments, a centerline of the rim extends along a rim plane perpendicular to the axis of rotation. Each tooth includes a proximal end coupled to the rim, a distal end spaced apart from the proximal end, and a face extending between the proximal end and distal end. The face extends outward from and along a face plane extending between the proximal end and distal end. The face plane is angled relative to the axis of rotation and the centerline.

In illustrative embodiments, the distal end of each tooth includes a rounded edge and at least one beveled surface extending from the rounded edge. The beveled surface forms at least a portion of the face.

In illustrative embodiments, each tooth includes a multi-faceted face having a first facet and a spaced apart second facet. The first and second facets extend along separate planes that intersect one another at an angle. The line of intersection of the planes is offset from the centerline and axis of rotation.

In illustrative embodiments, each tooth further includes a crown defining a linear crown apex. The crown apex is generally perpendicular to the line of intersection. The crown apex is angled with respect to the centerline and the axis of rotation.

In illustrative embodiments, the face of each tooth further includes a third facet extending between the first and second facets.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
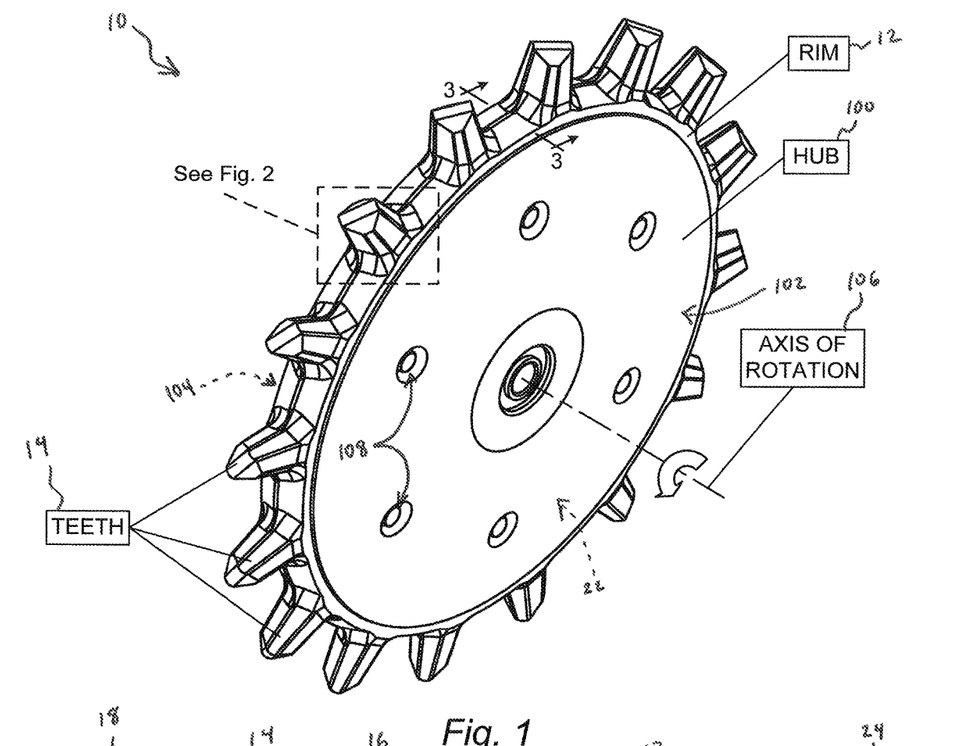
FIG. 1 is a perspective view of seed furrow closing wheel in accordance with the present disclosure showing that the closing wheel includes a rim and a plurality of teeth extending outward from a periphery of the rim and suggesting that the rim is configured to engage with a hub to allow rotation of the closing wheel.

A seed furrow closing wheel 10 in accordance with the present disclosure is shown in FIG. 1. Closing wheel 10 includes a rim 12 and a plurality of teeth 14 extending outward from rim 12 and circumferentially spaced apart from one another. Each tooth 14 includes a multi-faceted face 16 (shown illustratively as a shaded region on tooth 14 in FIG. 2) extending from a proximal end 11 to a distal end 13 of tooth 14 and a crown 18 positioned at distal end 13 as suggested in FIG. 2. Face 16 and crown 18 are configured to engage with ground soil G to close a seed furrow 110 as suggested in FIGS. 8 and 9.

Figures 2, 3:
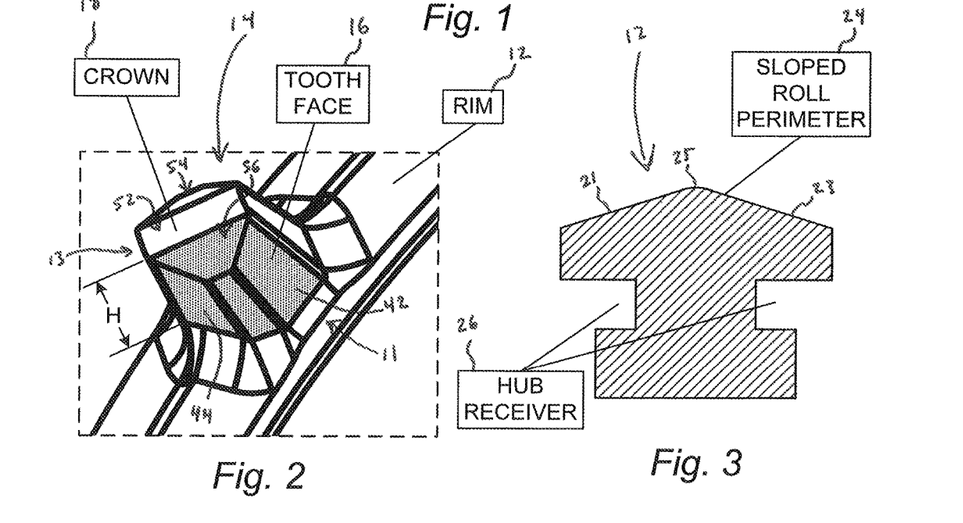
FIG. 2 is an enlarged view of one of the teeth of FIG. 1 showing that each tooth includes a multi-faceted face and a crown.
FIG. 3 is a sectional view taken along line 3-3 in FIG. 1 showing that the rim includes a sloped roll perimeter and a hub receiver for engaging with the hub.

Rim 12 includes an outer, sloped roll perimeter 24 and a hub receiver 26 as suggested in FIG. 3. Sloped roll perimeter 24 is configured to allow closing wheel 10 to roll along ground soil G surrounding a seed furrow while minimizing compaction of the ground soil and ground soil pick-up. Sloped roll perimeter 24 includes a pair of converging perimeter walls 21, 23 which meet at a rounded peak 25. Perimeter walls 21, 23 are angled relative to one another.

A hub 100 engages with hub receiver 26 to carry closing wheel 10 for rotation about an axis 106 as suggested in FIG. 1. Hub 100 includes hub plates 102, 104, as suggested in FIG. 4, which are secured together with fasteners 108 to clamp closing wheel 10 therebetween, as suggested in FIG. 1. Rim 12 is annular to minimize the weight of closing wheel 10 and defines an open center region 22 as suggested in FIG. 5. Hub 100 covers open center region 22 when attached to closing wheel 10 as suggested in FIG. 1.

Figure 4:
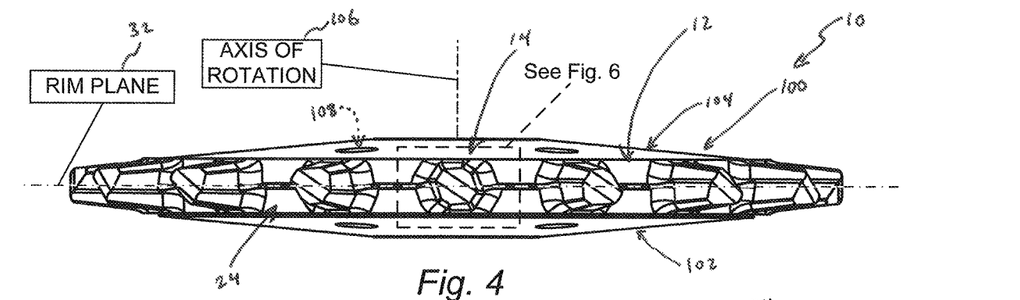
FIG. 4 is a top plan view of the closing wheel of FIG. 1 showing that a centerline of the closing wheel extends along a plane that is perpendicular to the axis of rotation and generally aligned with an apex of the roll perimeter of the rim.
Figure 5:
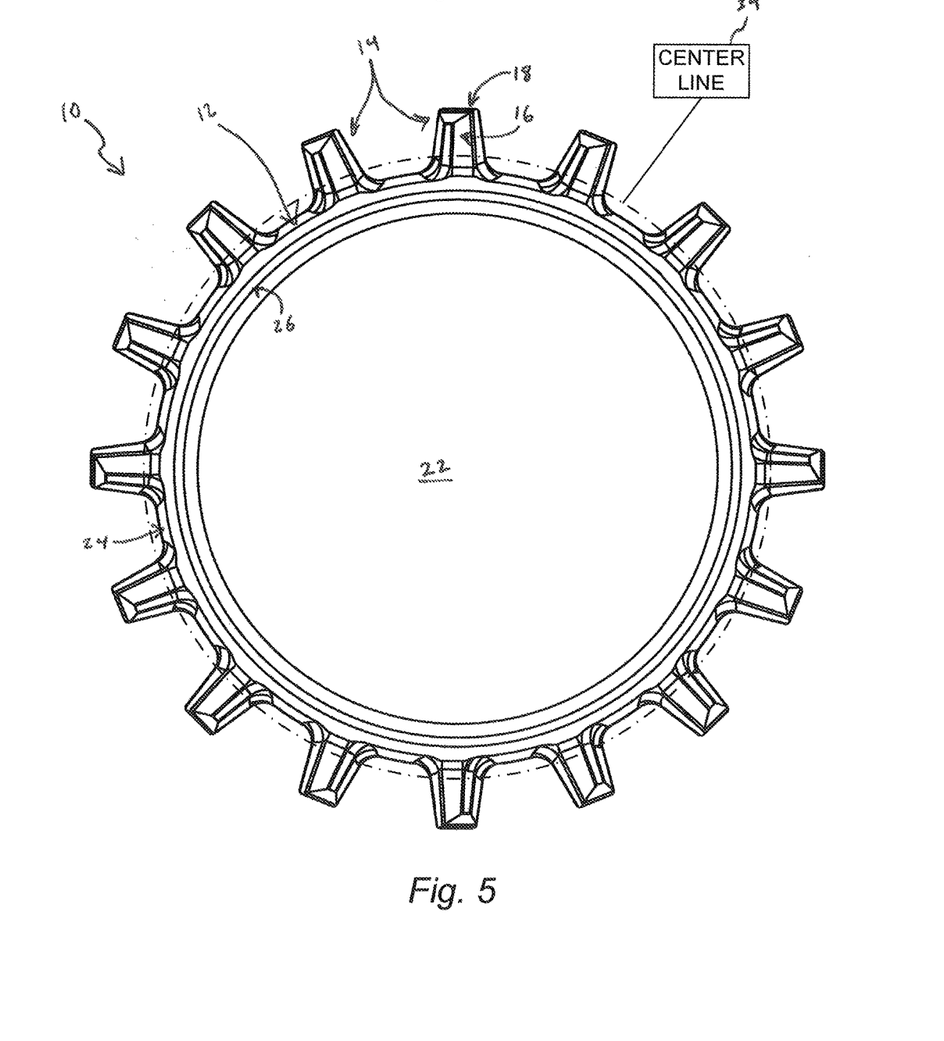
FIG. 5 is a front elevation view of the closing wheel of FIG. 1 with the hub removed showing that the rim is annular.

A rim plane 32 extends through rim 12 and is perpendicular to axis of rotation 106 as suggested in FIG. 4. In the illustrative embodiment, rim plane 32 is aligned with an apex of perimeter walls 21, 23 of sloped roll perimeter 23 at peak 25. A centerline 34 of rim 12 is defined around a periphery of rim 12 along an intersection of the apex of sloped roll perimeter 24 and rim plane 32 as suggested in FIGS. 5 and 6.

Figure 6:
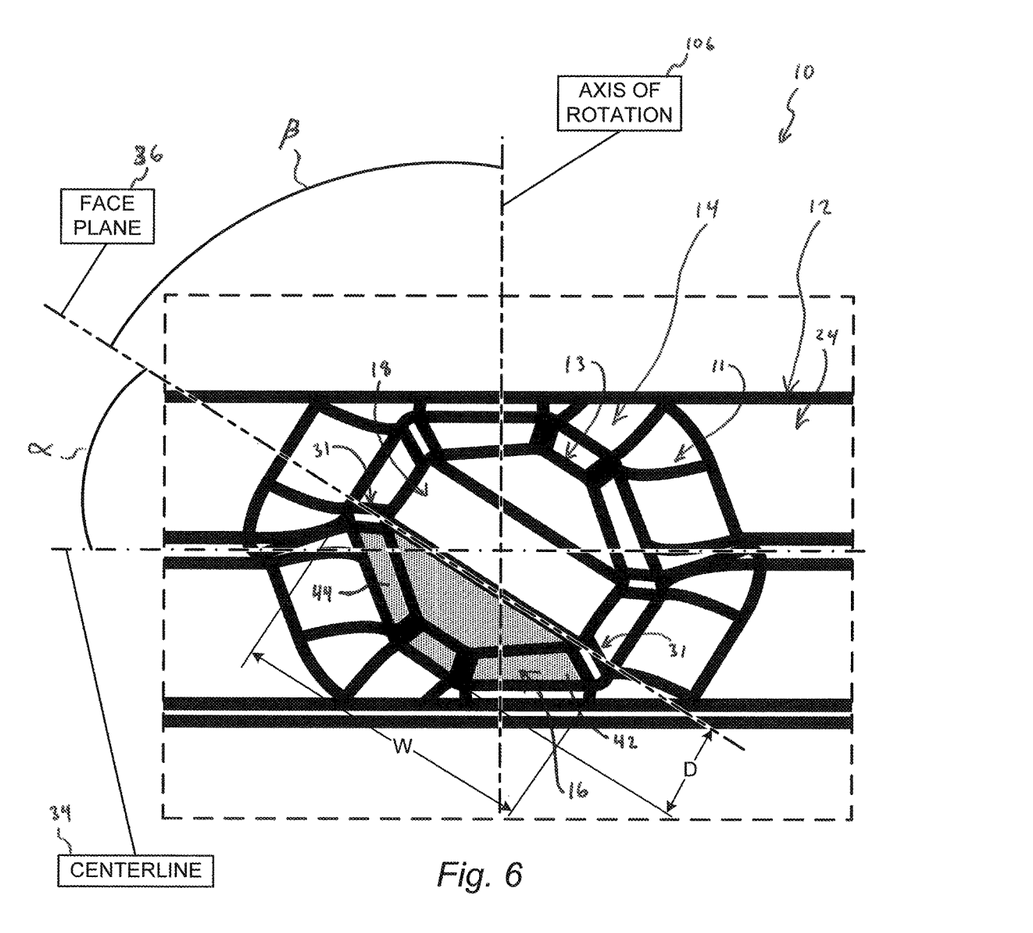
FIG. 6 is an enlarged view of one of the teeth of FIG. 4 showing that a face plane extending through the tooth is angled with respect to the centerline and the axis of rotation of the closing wheel and suggesting that the face of the tooth extends along and outward from the face plane.

In one illustrative embodiment, a face plane 36 extends through distal end 13 and proximal end 11 of tooth 14 as suggested in FIG. 6. Tooth face 16 extends along and outward from face plane 36. A height H of face 16 is defined between proximal end 11 and distal end 13 of tooth 14 as suggested in FIG. 2. A width W of face 16 is defined between lateral edges 31 extending from proximal end 11 to distal end 13 where face 16 meets with face plane 36 as suggested in FIG. 6. A depth D of face 16 is defined by how far face 16 extends away from face plane 36. In some embodiments, tooth face 16 is formed in any shape that extends along and outward from face plane 36 such that a depth D of face 16 is less than a width W of face 16. For example, tooth face 16 can be a continuous surface and not faceted. In another example, tooth face 16 is flat and coplanar with face plane 36.

In the illustrative embodiment, each tooth 14 of closing wheel 10 is arranged on rim 12 such that face plane 36 is angled with respect to centerline 34 and axis 106 as suggested in FIG. 6. Face plane 36 is arranged at an angle $\alpha$ with respect to centerline 34 and an angle $\beta$ with respect to axis 106. Angles $\alpha$, $\beta$ together equal 90 degrees. In some embodiments, angle $\alpha$ is between about 10 degrees and about 80 degrees. Preferably, angle $\alpha$ is between about 25 degrees and about 50 degrees. More preferably, angle $\alpha$ is between about 30 degrees and about 45 degrees. In some embodiments, angle $\alpha$ is about 34 degrees. In some embodiments, each tooth 14 is arranged such that a majority of face 16 is positioned to one side of centerline 34.

Figure 7:
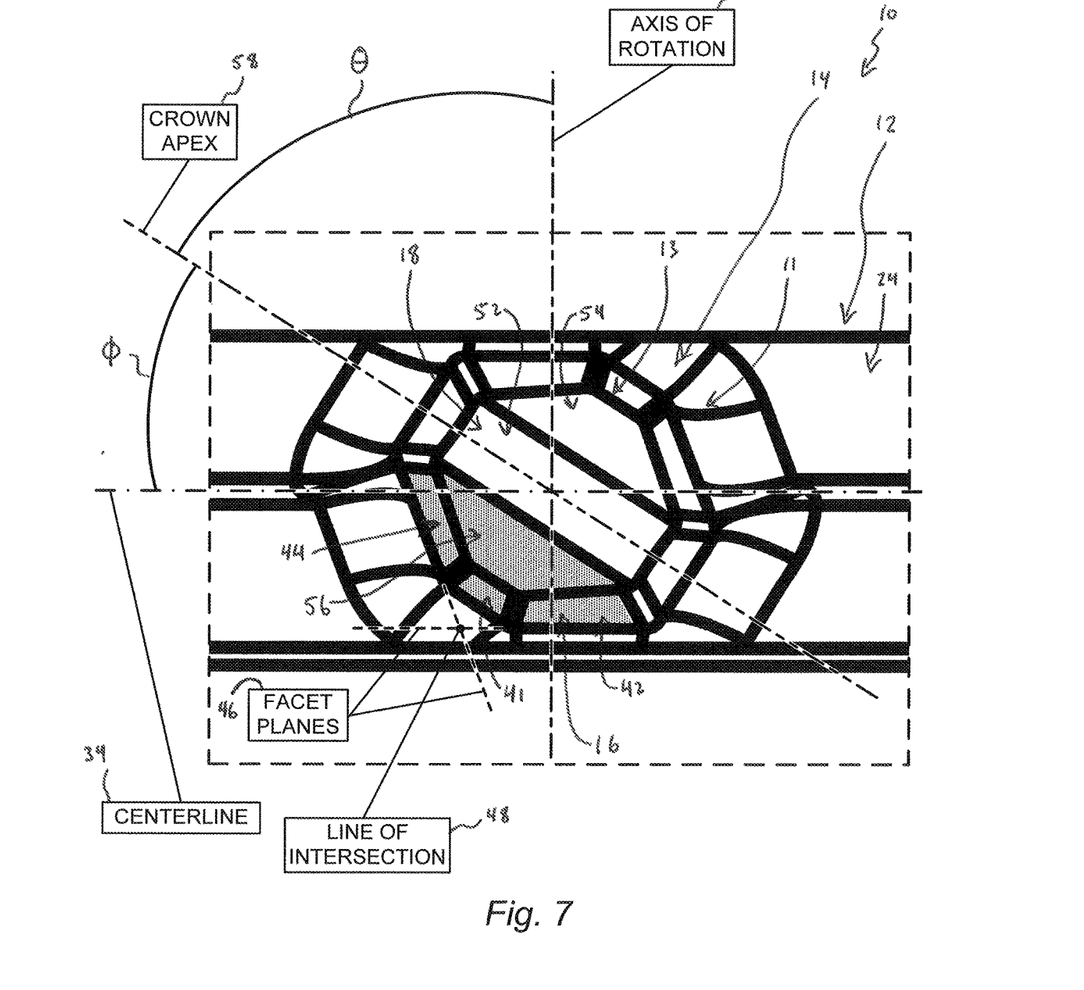
FIG. 7 is a view similar to FIG. 6 showing that the face includes two converging facets and suggesting that planes defined by the converging facets meet along a line of intersection that is offset from the centerline and axis of rotation and that a linear apex defined by the crown is angled with respect to the centerline and axis of rotation.

In the illustrative embodiment, each tooth face 16 includes a pair of converging facets 42, 44 as suggested in FIGS. 2 and 7. Facets 42, 44 are angled with respect to one another such that facet planes 46 defined by facets 42, 44 intersect one another along a line of intersection 48 as suggested in FIG. 7. Line of intersection 48 is offset from centerline 34 and axis of rotation 106. An intermediate facet 41 extends between converging facets 42, 44.

Crown 18 includes a rounded edge 52 and a pair of beveled surfaces 54, 56 extending from rounded edge 52 as suggested in FIGS. 2 and 7. Beveled surfaces 54, 56 are angled with respect to one another and lie in planes which intersect to define a linear crown apex 58 of crown 18. Crown apex 58 is arranged at an angle $\phi$ with respect to centerline 34 and an angle $\theta$ with respect to axis 106. Angles $\phi$, $\theta$ together equal 90 degrees. In some embodiments, angle $\phi$ is between about 10 degrees and about 80 degrees. Preferably, angle $\phi$ is between about 25 degrees and about 50 degrees. More preferably, angle $\phi$ is between about 30 degrees and about 45 degrees. In some embodiments, angle $\phi$ is about 34 degrees. Beveled surface 56 forms a portion of face 16. In some embodiments, beveled surfaces 54, 56 extend to meet one another to form a sharp edge instead of rounded edge 52.

In the illustrative embodiment, each tooth 14 is formed symmetrically across crown apex 58 such that two faces are formed as suggested in FIG. 7. In some embodiments, only one face is defined on each tooth 14. Each tooth 14 is formed to minimize ground soil-pick up. An angular position and orientation of face 16 is selected such that an amount of ground soil G directed toward seed furrow 110 during closing of seed furrow 110 is maximized as suggested in FIGS. 8 and 9. For example, aligning tooth face 16 with centerline 34 may cause ground soil to be picked up and directed away from seed furrow 110, which is undesirable. By angling face 16, ground soil contacting face 16 during closing of seed furrow 110 is directed back toward seed furrow 110.

Figure 8:
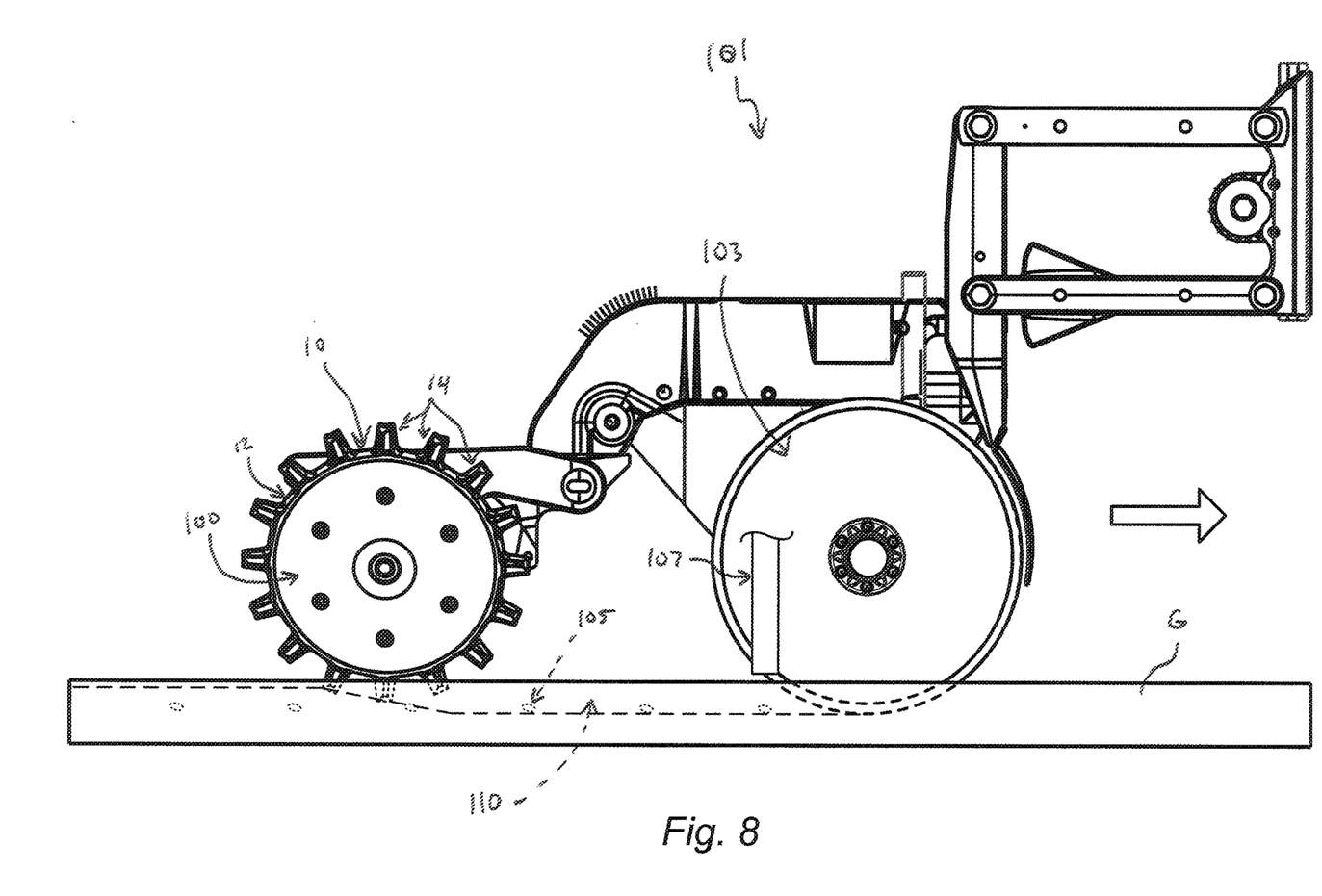
FIG. 8 is a side elevation view of an adjustable frame for connection with a planter unit showing that a seed furrow cutter forms a seed furrow where seeds to be planted are placed by the planter unit and suggesting that one or more furrow closing wheels engage with the ground soil to cover the seeds and close the furrow.

Hub 100 is configured to be mounted on an adjustable frame 101 to carry closing wheel 10 along ground soil G to close seed furrow 110 as suggested in FIG. 8. A trench cutter 103 opens seed furrow 110 and a seed layer 107 deposits seeds 105 into seed furrow 110. A motive force, such as a tractor (not shown), moves adjustable frame 101 to continuously plant seeds 105 in ground soil G.

Figure 9:
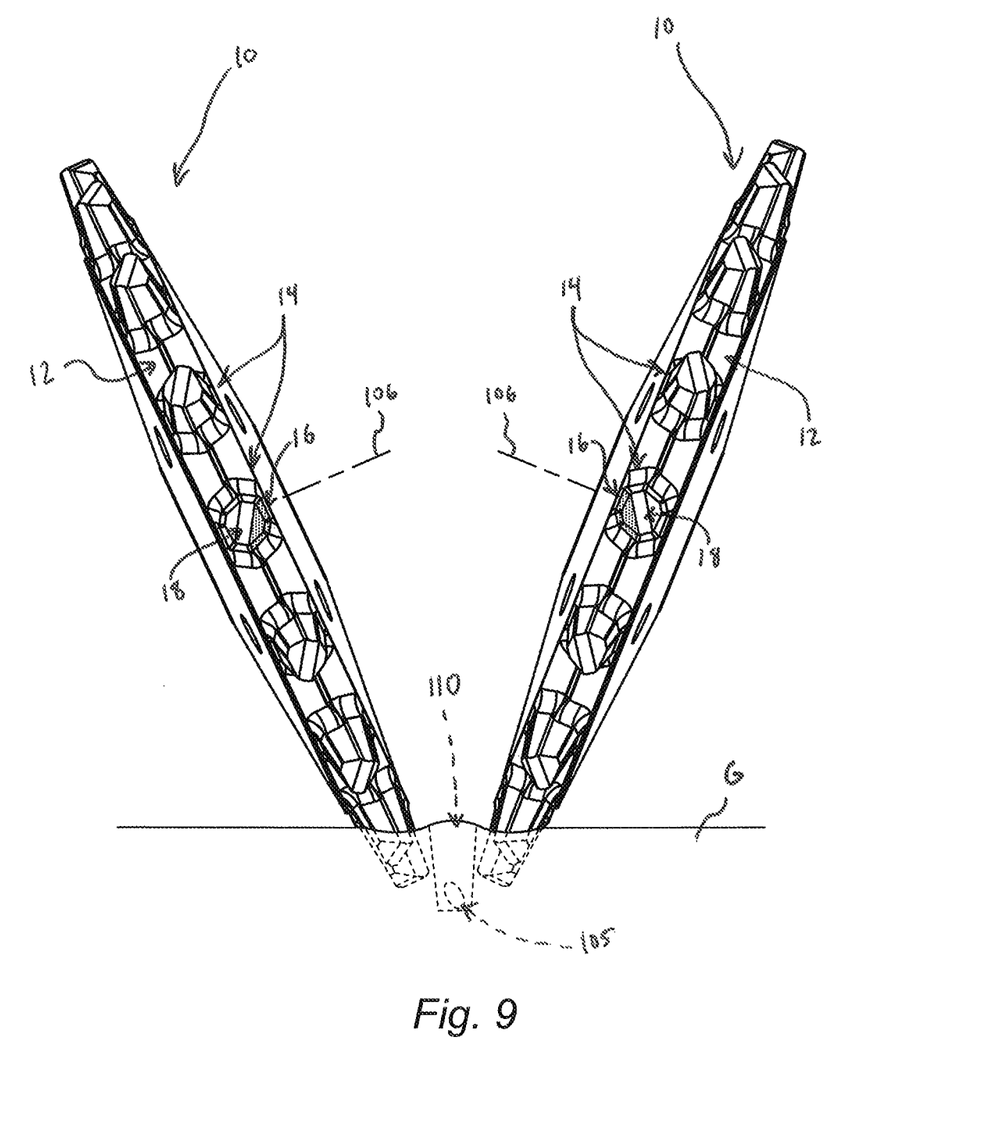
FIG. 9 is a front elevation view of a pair of furrow closing wheels positioned at a positive camber such that the lower ends of the closing wheels are closer together than the upper ends to form a generally V-shape configuration and suggesting that the faces of the teeth of each wheel are positioned to rake ground soil toward the seed furrow and direct any residual soil carried by the teeth back toward the seed furrow to cover the seeds and close the furrow as the closing wheels rotate.

In the illustrative embodiment, two closing wheels 10 are used to close seed furrow 110 as suggested in FIG. 9. Closing wheels 10 are positioned at a positive camber such that the lower ends of closing wheels 10 are closer together than the upper ends to form a generally V-shape configuration. Closing wheels 10 are angled with respect to one another such that faces 16 of each tooth 14 are arranged to rake ground soil G toward seed furrow 110 to close seed furrow 110 (as shown in FIG. 9) as closing wheels 10 roll along ground soil G and to direct any residual soil carried by teeth 14 back toward seed furrow 110.

In illustrative embodiments, a seed furrow closing wheel 10 includes an annular rim 12 and a plurality of teeth 14 extending radially outward from the rim 12 and circumferentially spaced apart from one another as shown in FIG. 1. The rim 12 is adapted for rotation about an axis 106. A centerline 34 of the rim 12 extends along a rim plane 32 arranged perpendicular to the axis 106 as suggested in FIGS. 4-6. Each tooth 14 includes a proximal end 11 coupled to the rim 12, a distal end 13 spaced apart from the proximal end 11, a face plane 26 extending through the proximal end 11 and distal end 13, and a face 16 extending along the face plane 36 between the proximal end 11 and distal end 13. The face plane 36 is angled relative to the axis 106 (angle $\beta$) and the centerline 34 (angle $\alpha$) as shown in FIG. 6.

In illustrative embodiments, a seed furrow closing wheel 10 includes an annular rim 12 and a plurality of teeth 14 extending radially outward from the rim 12 and circumferentially spaced apart from one another as shown in FIG. 1. The rim 12 is adapted for rotation about an axis 106. A centerline 34 of the rim 12 extends along a rim plane 32 arranged perpendicular to the axis 106 as suggested in FIGS. 4-5 and 7. Each tooth 14 includes a multi-faceted face 16 having a first facet 42 and a spaced apart second facet 44 as shown in FIG. 7. The first and second facets 42, 44 extending along separate planes 46 that intersect one another at an angle along a line of intersection 48. The line of intersection 48 of the planes 46 is offset from the centerline 106 and axis of rotation 34.

In illustrative embodiments, each tooth 14 includes a crown 18 defining a linear crown apex 58 spaced apart from the rim 12 as suggested in FIG. 7. The crown apex 58 is generally perpendicular to the line of intersection 48. The crown apex 58 is angled with respect to the centerline 34 (angle $\phi$) and the axis of rotation 106 (angle $\theta$).

In illustrative embodiments, a seed furrow closing wheel 10 includes an annular rim 12 and a plurality of teeth 14 extending radially outward from the rim 12 and circumferentially spaced apart from one another as shown in FIG. 1.

The annular rim 12 having a sloped roll perimeter 24 and a hub receiver 26 as shown in FIG. 3. The teeth 14 extend radially outward from the sloped roll perimeter 24 of the rim 12 as suggested in FIG. 4. A hub 100 is coupled to the hub receiver 26 and adapted to carry the rim 12 for rotation about an axis 106. A centerline 34 of the rim 12 extends along a rim plane 32 arranged perpendicular to the axis 106 as suggested in FIGS. 4-6. Each tooth 14 includes a proximal end 11 coupled to the rim 12, a distal end 13 spaced apart from the proximal end 11, a face plane 26 extending through the proximal end 11 and distal end 13, and a face 16 extending along the face plane 36 between the proximal end 11 and distal end 13. The face plane 36 is angled relative to the axis 106 (angle β) and the centerline 34 (angle α) as shown in FIG. 6.

What is claimed is:

1. A seed furrow closing wheel comprising:
    an annular rim adapted for rotation about an axis, a centerline of the rim extending along a rim plane arranged perpendicular to the axis, the rim plane dividing the rim into substantially equal thickness halves, and
    a plurality of teeth extending radially outward from the rim and circumferentially spaced apart from one another, each tooth including a proximal end coupled to the rim, a distal end spaced apart from the proximal end, a face plane extending through the proximal end and distal end, and a face extending along the face plane between the proximal end and distal end, the face plane positioned at a non-parallel angle relative to the axis and the centerline,
    wherein a height of each tooth is defined between the proximal end and distal end of the tooth, the face of each tooth defines an overall width of the tooth, and the face of each tooth is positioned substantially to one side of the rim plane, and
    wherein each tooth includes a generally linear crown that is spaced apart from the annular rim and positioned at an angle with respect to the centerline and the axis of rotation.

2. The seed furrow closing wheel of claim 1, wherein the distal end of each tooth includes a rounded edge and at least one beveled surface extending from the rounded edge.

3. The seed furrow closing wheel of claim 2, wherein the beveled surface forms at least a portion of the face.

4. The seed furrow closing wheel of claim 1, wherein the rim is formed to define a sloped roll perimeter having a pair of converging perimeter walls that meet at a rounded peak, and wherein the perimeter walls are positioned at a non-parallel angle relative to one another.

5. The seed furrow closing wheel of claim 4, wherein the rim plane is aligned with an apex of the perimeter walls of the sloped roll perimeter at the peak, and wherein the centerline is defined around a periphery of the rim along an intersection of the apex of the sloped roll perimeter and the rim plane.

6. The seed furrow closing wheel of claim 1, wherein each face extends outward from the face plane to a depth less than the width.

7. The seed furrow closing wheel of claim 1, wherein each face is multi-faceted.

8. The seed furrow closing wheel of claim 1, wherein each face plane is arranged at an angle with respect to the centerline of about 25 degrees to about 50 degrees.

9. A seed furrow closing wheel comprising:
    an annular rim adapted for rotation about an axis, a centerline of the rim extending along a rim plane arranged perpendicular to the axis, the rim plane dividing the rim into substantially equal thickness halves, and
    a plurality of teeth extending radially outward from the periphery of the rim and circumferentially spaced apart from one another,
    wherein each tooth includes a multi-faceted face having a first facet and a spaced apart second facet, the first and second facets extending along separate facet planes that intersect one another at a non-parallel angle along a line of intersection, and the line of intersection of the facet planes is offset from the centerline and axis of rotation
    wherein each tooth further includes a crown defining a generally linear crown apex spaced apart from the rim, wherein the crown apex is generally perpendicular to the line of intersection, and wherein the crown apex is positioned at an angle with respect to the centerline and the axis of rotation.

10. The seed furrow closing wheel of claim 9, wherein linear apex is arranged at an angle with respect to the centerline of about 25 degrees to about 50 degrees.

11. The seed furrow closing wheel of claim 9, wherein the face of each tooth further includes a third facet extending between the first and second facets.

12. The seed furrow closing wheel of claim 11, wherein the face of each tooth further includes a beveled surface extending between the first and second facets and extending away from the third facet.

13. The seed furrow closing wheel of claim 9, wherein the rim is formed to define a sloped roll perimeter having a pair of converging perimeter walls that meet at a rounded peak, and wherein the perimeter walls are positioned at a non-parallel angle relative to one another.

14. The seed furrow closing wheel of claim 13, wherein the rim plane is aligned with an apex of the perimeter walls of the sloped roll perimeter at the peak, and wherein the centerline is defined around a periphery of the rim along an intersection of the apex of the sloped roll perimeter and the rim plane.

15. A seed furrow closing wheel comprising:
    an annular rim having a sloped roll perimeter and a hub receiver,
    a hub coupled to the hub receiver and adapted to carry the rim for rotation about an axis, a centerline of the rim extending along a rim plane arranged perpendicular to the axis, the rim plane dividing the rim into substantially equal thickness halves, and
    a plurality of teeth extending radially outward from the sloped roll perimeter of the rim and circumferentially spaced apart from one another, a proximal end coupled to the rim, a distal end spaced apart from the proximal end, a face plane extending through the proximal end and distal end, and a face extending along the face plane between the proximal end and distal end, the face plane positioned at a non-parallel angle relative to the axis and the centerline,
    wherein a height of each tooth is defined between the proximal end and distal end of the tooth, the face of each tooth defines an overall width of the tooth, and the face of each tooth is positioned substantially to one side of the rim plane, and
    wherein each tooth includes a generally linear crown that is spaced apart from the annular rim and positioned at an angle with respect to the centerline and the axis of rotation.

16. The seed furrow closing wheel of claim 15, wherein the sloped roll perimeter has a pair of converging perimeter walls that meet at a rounded peak, and wherein the perimeter walls are positioned at a non-parallel angle relative to one another, wherein the rim plane is aligned with an apex of the perimeter walls of the sloped roll perimeter at the peak, and wherein the centerline is defined around a periphery of the rim along an intersection of the apex of the sloped roll perimeter and the rim plane.

17. The seed furrow closing wheel of claim 15, wherein each face extends outward from the face plane to a depth less than the width.

18. The seed furrow closing wheel of claim 15, wherein each face plane is arranged at an angle with respect to the centerline of about 25 degrees to about 50 degrees.

19. The seed furrow closing wheel of claim 15, wherein the face of each tooth is multi-faceted having a first facet and a spaced apart second facet, wherein the first and second facets extending along separate facet planes that intersect one another at a non-parallel angle along a line of intersection, and wherein the line of intersection of the facet planes is offset from the centerline and axis of rotation.

* * * * *